United States Patent [19]
Pessina et al.

[11] Patent Number: 5,967,741
[45] Date of Patent: Oct. 19, 1999

[54] METHOD AND APPARATUS FOR PALLETIZING PARCELS WITH UPPER ACCOMPANYING DEVICE

[75] Inventors: Giorgio Pessina; Aldo Perobelli, both of Milanino, Italy

[73] Assignee: O.M.G. de Giorgio Pessina e Aldo Perobelli S.n.c., Milan, Italy

[21] Appl. No.: 08/945,405

[22] PCT Filed: Apr. 19, 1996

[86] PCT No.: PCT/IT96/00078

§ 371 Date: Oct. 23, 1997

§ 102(e) Date: Oct. 23, 1997

[87] PCT Pub. No.: WO96/33933

PCT Pub. Date: Oct. 31, 1996

[30] Foreign Application Priority Data

Apr. 27, 1995 [IT] Italy .................................. MI95A0851

[51] Int. Cl.⁶ .................................................. B65G 47/31
[52] U.S. Cl. .................................. 414/792.6; 198/462.1; 198/418.5
[58] Field of Search ............................. 198/462.1, 462.3, 198/418.5, 626.2, 626.5, 626.6; 414/792.6, 799, 907

[56] References Cited

U.S. PATENT DOCUMENTS

| | | | |
|---|---|---|---|
| 3,830,354 | 8/1974 | Sarring | 198/626.6 |
| 4,230,218 | 10/1980 | Kunzmann | 198/626.5 |
| 4,458,805 | 7/1984 | Jodrey et al. | 198/481 |
| 4,711,612 | 12/1987 | Kwauka | 414/792.6 |
| 5,135,351 | 8/1992 | Rathert | 414/792.6 |
| 5,261,520 | 11/1993 | Duke | 198/462.3 |

FOREIGN PATENT DOCUMENTS 0190906 8/1986 European Pat. Off. .
0566839 10/1993 European Pat. Off. .

Primary Examiner—Christopher P. Ellis
Assistant Examiner—Gregory A. Morse
Attorney, Agent, or Firm—Biebel & French

[57] ABSTRACT

Method and apparatus for arranging book, magazine, segnature parcels (A, B, . . . ) and the like in rows with a predefined separation of the parcels from one another for transferring them onto a pallet, said rows being formed by causing the parcels (A, B, . . . ) to advance integrally with a lower transportation device (3) and an upper transportation device (7) in lengths of a set amplitude.

7 Claims, 3 Drawing Sheets

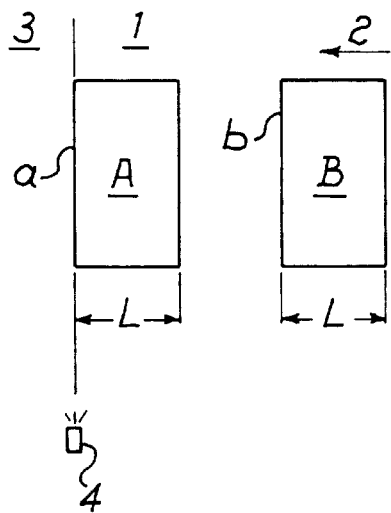
Fig.2
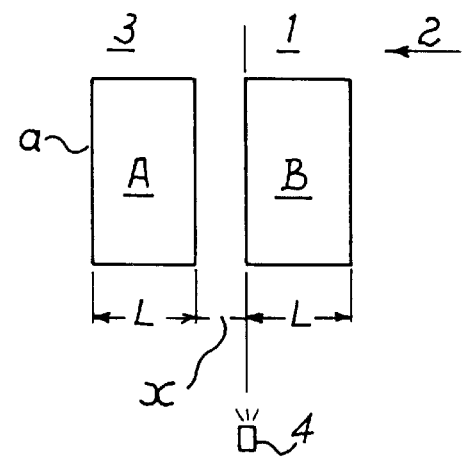
Fig.3
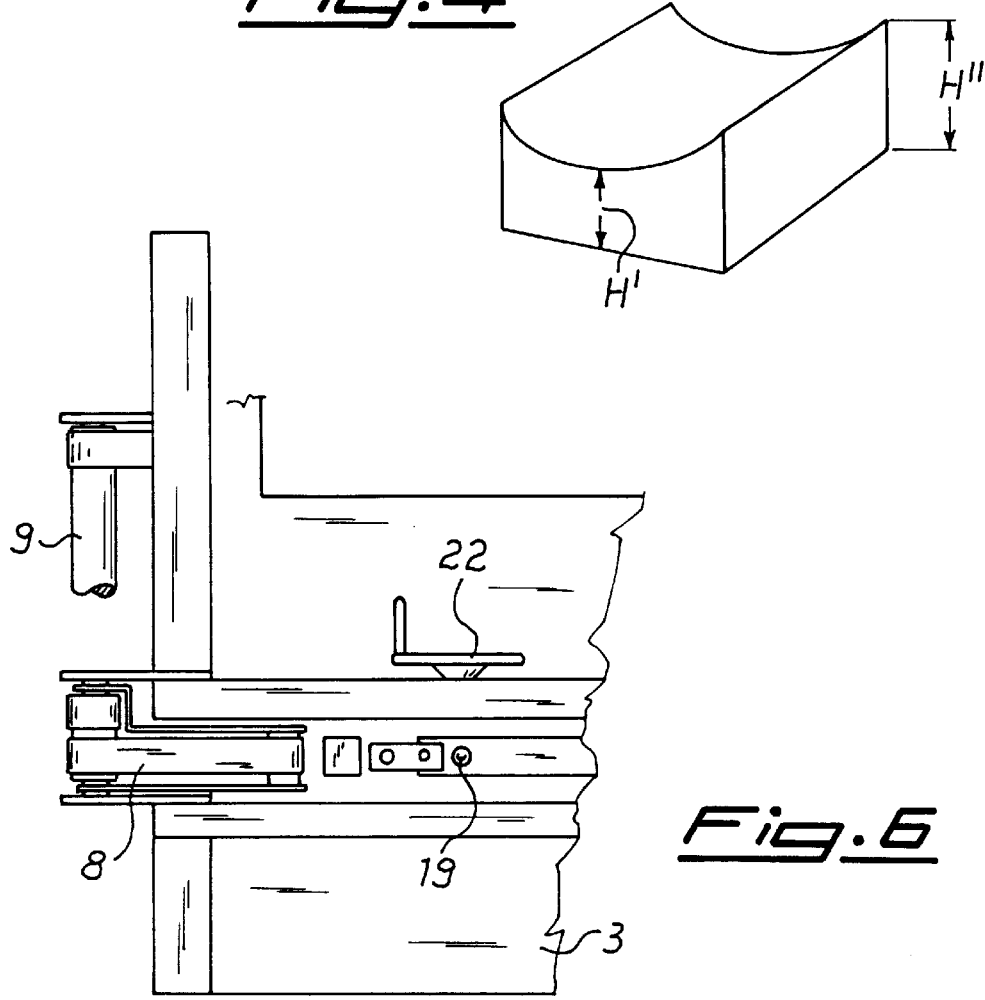
Fig.4
Fig.6

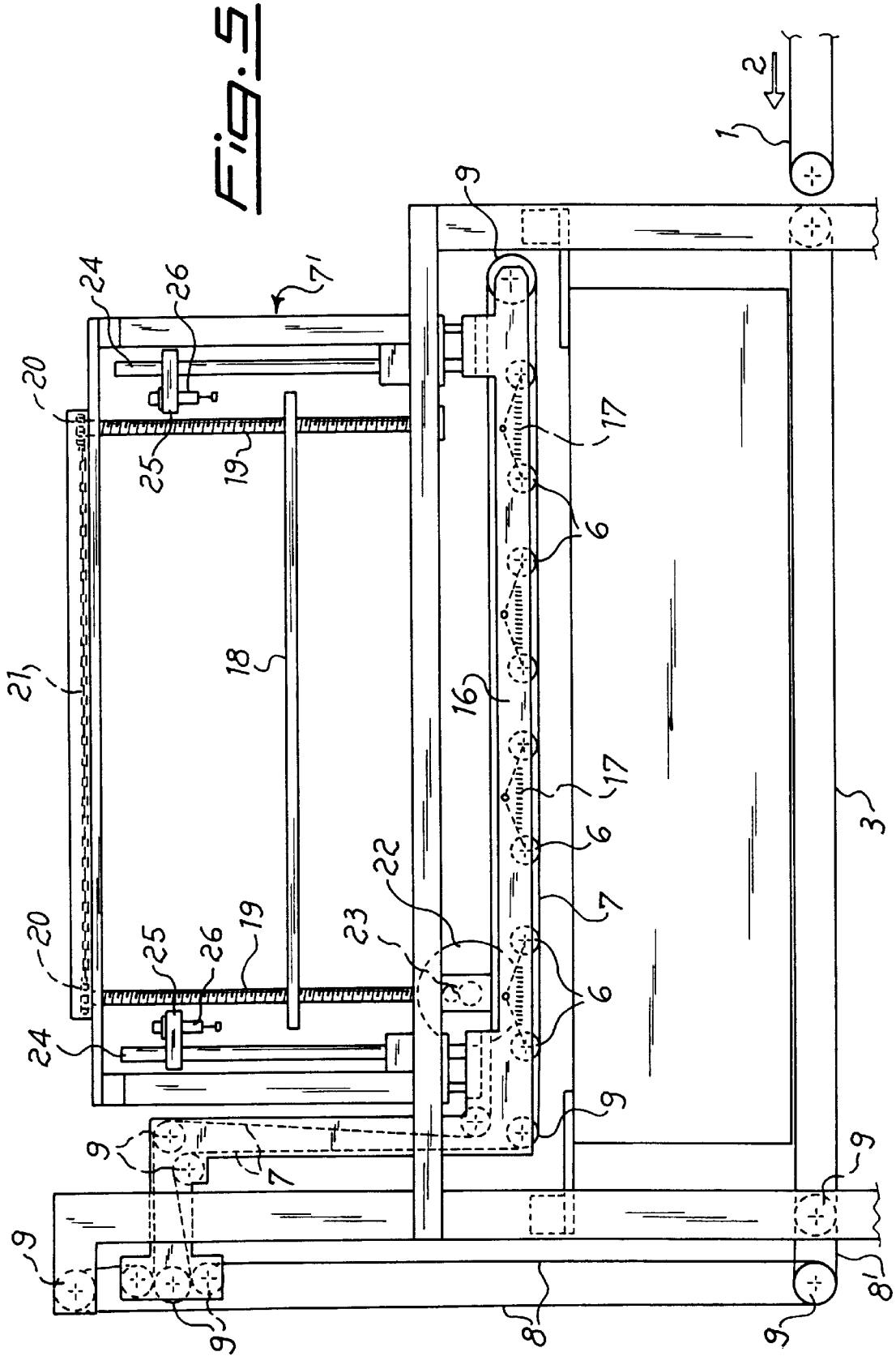

METHOD AND APPARATUS FOR PALLETIZING PARCELS WITH UPPER ACCOMPANYING DEVICE

BACKGROUND AND SUMMARY OF THE INVENTION

The present invention relates to a new method for palletizing book, magazine, segnature parcels and to the related apparatus, with the feature that the individual parcels are advanced between and integrally with first means consisting of a lower conveyor and second means consisting of an upper accompanying device, said device being superposed to the first means, for lengths that are a function of the parcel length and of the position each parcel is to be arranged in relative to the following one.

Precisely, the length the first parcel is to be advanced is equal to the length thereof plus the distance the second parcel is desired to be separated from the first one, and so on for the following parcels with the desired separations between successive parcels.

A further feature that is achieved is the height adjustment of said upper accompanying device as a function of the height of the parcel rows that progressively form.

Apparatuses for forming parcel rows with different separations of the parcels from one another are known, in which said parcel rows, once they have been formed, are transferred to the palletizing area.

Such known apparatuses are rather complicated and do not provide the certainty that precise separations of the parcels from one another are obtained and, especially in the case of parcels composed of loose, i.e. not tied to one another, books or segnatures, there is the hazard that the so formed stacks discompose or fall a part while the row of parcels to be palletized is being prepared.

One of these known apparatuses is described for example in European Patent No. 0562220.

The object of the present invention is to provide a method and apparatus in which said shortcomings do not come about. Said method and apparatus are based on the above-mentioned concepts, and in particular on the parcels being accompanied in the upper part jointly with their advancement by predefined lengths, and on the accompaniment means being adjusted in their height according to the height of the rows of parcels.

The features and advantages of the present invention will appear more clearly from the following detailed description concerning both the method and the apparatus, taken together with the attached drawings, in which:

BRIEF DESCRIPTION OF THE DRAWINGS

FIGS. 2 and 3 represent two advancement phases of the parcels of books, magazines or segnatures;

FIG. 4 represents a parcel having a peculiar conformation, in a perspective view;

FIG. 5 represents a front view of the subject apparatus; and

FIG. 6 represents a top plan view of a portion of the subject apparatus.

DETAILED DESCRIPTION OF THE PREFERRED EMBODIMENT

Figure 1:
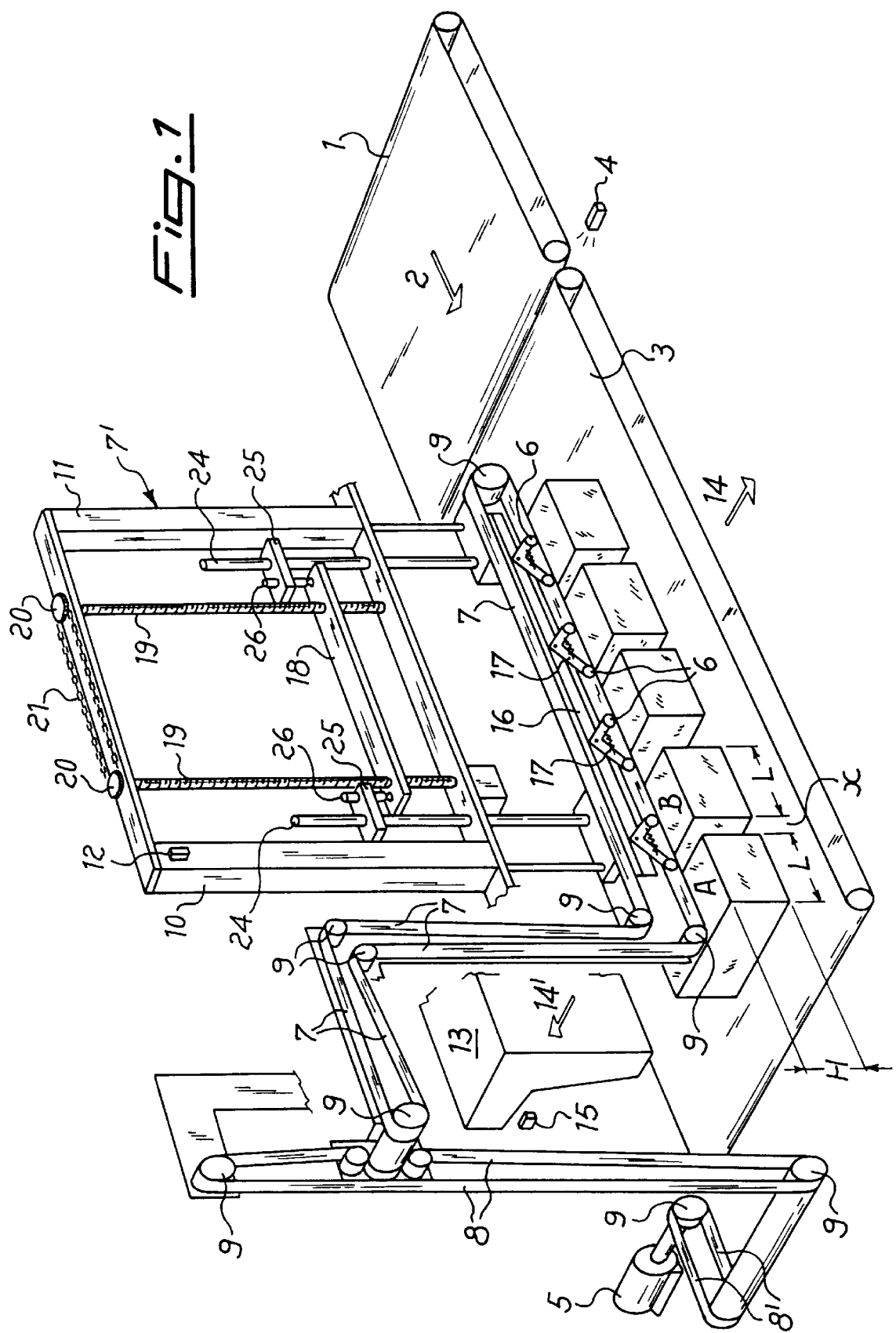
FIG. 1 represents a perspective view of the subject apparatus.

Referring now to FIGS. 1, 2 and 3, the method implemented by means of the subject apparatus comprises the following steps:

a first parcel arriving, for example, from a transportation means 1 proceeds in the direction shown by arrow 2 towards a first lower transportation means 3 consisting, for example, of a conveyor, thereby intercepting a photoelectric cell 4 the light beam of which is positioned between the two conveyors 1 and 3. The photoelectric cell 4 causes, through a brake-clutch 5, the conveyors 3 and 7 to proceed, and with said brake-clutch connected to a motor, not shown in the figure, the conveyors 3 and 7 will gradually advance by intervals metered by an encoder and controlled by a computer. Pressing rollers 6 or similar pressure means press a second transportation means, consisting of belt 7 of the upper accompaniment device 7', onto parcel A. Belt 7 is connected to conveyor 3 through rollers 9, belts 8,8' and brake-clutch 5, the conveyor 3 and the belt 7 thus moving together essentially at the same speed.

If it is desired to obtain a separation x between the first parcel A and a second parcel B, both of which are of length L, when side a of the first parcel A arrives in correspondence with the photoelectric cell 4 (FIG. 2), the conveyor 3 is advanced by a length L or by a length L+x and, at the same time, conveyor 1, which is continuously moving, causes the second parcel B to proceed, thereby bringing side b of the latter in correspondence with the photoelectric cell 4. From this relative position between parcels A and B (FIG. 3), conveyor 3 is caused to proceed together with, and at the same speed as, conveyor 1, so that the two parcels A and B will come out to be in the desired position, separated by a length x, on conveyor 3. By continuously successively repeating this procedure, the following parcels will successively be indexed on conveyor 3, as can be seen from FIG. 1, with a preassigned separation between said parcels.

For parcels A, B . . . touching one another, the separation x is null. From the above, it is evident that said motor causes the conveyor 1 to advance continuously and conveyor 3 intermittently, depending on the position of the parcels relative to the photoelectric cell 4.

The same result might be achieved by connecting a motor to conveyor 3, a second motor to belt 7, said motors rotating at the same speed again under the influence of the photoelectric cell 4, and a third motor to conveyor 1.

Once the row of parcels A, B, etc. is finished, the conveyor belt 7 is raised by means of the accompaniment device 7' to which the pneumatic cylinders 10 and 11 are fixed which raise the conveyor belt 7 over a pusher 13. By means of a sensor 12, when the conveyor belt 7 is in its uppermost position, the pusher 13 is actuated, which causes the row of parcels formed on the conveyor 3 to be moved in a direction that is perpendicular to the row of parcels according to arrow 14 towards the palletizing area, which is per se known and consequently not shown.

In the return stroke, carried out according to arrow 14', the pusher 13 actuates a sensor 15 that causes the upper belt 7 to be lowered to the right level, corresponding to the height H of the row of parcels to be palletized. As shown in FIG. 1, the belt 7 is supported by frame 16 and pressed by rollers 6 that are biased by means of springs 17. Said level H is determined by stop 18 that can be adjusted by means of two screws 19 onto which pinions 20 are fittingly engaged, said pinions being interconnected by a chain 21. These screws are operated by means of a handwheel 22 and a motor through a bevel pinion-and-gear assembly 23 which is connected to one of the screws 19 (FIGS. 5, 6). Guide rods 24 are fixed to the frame 16 supporting belt 7, supports 25 being solidly connected to said guide rods, vibration dampers 26 being secured to said supports 25 to absorb the kinetic energy of frame 16, which is driven by cylinders 10 and 11, when it arrives in abutment against the adjustable stop 18.

Said stop 18, during the palletizing steps, can be connected to a control apparatus which, by means of a suitable programme, can change the position of stop 18. This would be necessary in case the palletizing operation ought to be carried out on rows of parcels having different heights, or parcels coming from packaging lines providing parcels as shaped as shown in FIG. 4. This parcel has a concave upper surface and, consequently, two different heights H' and H". When the orientation of such parcels is changed, with rows rotated by 90° to one another, the height of the upper accompaniment belt 7 will consequently have to be modified.

The advantage offered by the above-described accompaniment belt 7 consists in the possibility of pre-arranging rows of parcels formed by non-bound stacks of books, magazines or segnatures, i.e. not wrapped in paper or film, in such a way that said stacks remain stable, that is do not discompose or fall apart during the preparation step of the row to be palletized. Indeed the upper accompaniment belt 7 exerts a pressure onto the parcels, thereby preventing the stacks from breaking up during the starting, transportation and stopping phases, that are carried out jerkily during the displacement of conveyor 3.

A further advantage offered by the accompaniment belt is that the slippage between the lower conveyor 3 and the parcel, that would inevitably occur because of the inertia of the parcel in the starting and stopping phases, is eliminated. Thus there is obtained the maximum precision in the repetitive pre-arrangement for the rows to be palletized.

Additions and/or modifications can obviously be added to the above-described method and apparatus, yet remaining within the scope of the present invention as claimed in the attached claims.

What is claimed is:

1. A method for arranging book, magazine, signature parcels (A, B, . . . ) not tied to one another in a pre-set position relative to one another, thereby forming rows of parcels with predefined distances of the parcels from one another, comprising the steps of: continuously advancing the individual parcels (A, B, . . . ) with a conveyor means (1) and intermittingly advancing the individual parcels (A, B, . . . ) integrally with a lower transportation means (3) and an upper transportation means (7) and clamped therebetween in such a way that the first parcel (A) is advanced by a length equal to the length (L) of the first parcel plus the distance (X) that is desired to have between the first (A) and the second (B) parcel, and that the ensuing joint advancement of the second parcel (B) with parcel (A) is at least by the same amplitude as its length (L), and so on for the subsequent parcels.

2. An apparatus for arranging book, magazine, signature parcels (A, B, . . . ) not tied to one another in a pre-set position relative to one another, thereby forming rows of parcels with predefined distances of the parcels from one another, comprising a conveyor means (1) continuously advancing and feeding the individual parcels (A, B, . . . ) to a lower transportation means (3), an upper transportation means (7) superposed to the first one, means for clamping the parcels (A, B, . . . ) between the same, means (8, 8', 9) are provided for intermittingly advancing such lower and upper transportation means (3, 7) integrally with said parcels for a length of an amplitude of the length (L) of the parcels plus the distance (X) that is desired to have between the first parcel (A) and the second parcel (B) and so on for the subsequent parcels for the complete formation of each row of parcels, said means (1, 3, 7) moving at essentially the same speed.

3. An apparatus as claimed in claim 2, characterized in that a motor is directly connected to the conveyor means (1) and to the transportation means (3 and 7) by means of a brake-clutch (5) which in turn is controlled by a photoelectric cell (4) interposed between the conveyor means (1) and the lower transportation means (3) which in turn is controlled by a photoelectric cell (4) interposed between the means (1 and 3).

4. An apparatus as claimed in claim 2, characterized in that there are provided a first motor connected to the means (3), a second motor connected to the means (7), both rotating at the same speed under the influence of a photoelectric cell (4), and a third motor connected to means (1) that moves continuously at the same speed as the means (3, 7).

5. An apparatus as claimed in claim 2, characterized in that means for the height adjustment (7') of the means (7) comprise two cylinders (10, 11) that are suited to raise and lower said means (7), and that there are provided a height-adjustable stop (18) and supports (25) integrally connected to a frame (16) supporting the means (7), so that when said means (7) is lowered said supports (25) rest on said stop (18) according to the height (H) of the row of parcels (A, B, . . . ).

6. An apparatus as claimed in claim 5, characterized in that vibration dampers (26) are secured to said supports (25), said vibration dampers (26) being suited to get in contact with said stop (18) when said means (7) is lowered.

7. An apparatus as claimed in claim 5, characterized in that it comprises screws coupled to said stop (18) and connected to a maneuvering handwheel (22) or to a motor that can be connected to a control apparatus which, by means of a suitable program, can change the position of the stop (18) according to the different heights (H) of the rows of parcels (A, B, . . . ).

* * * * *